United States Patent
Okahisa et al.

(10) Patent No.: US 9,908,160 B2
(45) Date of Patent: Mar. 6, 2018

(54) ROBOT SYSTEM AND METHOD FOR PRODUCING TO-BE-PROCESSED MATERIAL

(71) Applicant: KABUSHIKI KAISHA YASKAWA DENKI, Kitakyushu-shi (JP)

(72) Inventors: Manabu Okahisa, Kitakyushu (JP); Masami Nakakura, Kitakyushu (JP); Teppei Sonoda, Kitakyushu (JP)

(73) Assignee: KABUSHIKI KAISHA YASKAWA DENKI, Kitakyushu-Shi (JP)

(*) Notice: Subject to any disclaimer, the term of this patent is extended or adjusted under 35 U.S.C. 154(b) by 96 days.

(21) Appl. No.: 14/529,209

(22) Filed: Oct. 31, 2014

(65) Prior Publication Data
US 2015/0121983 A1    May 7, 2015

(30) Foreign Application Priority Data
Nov. 1, 2013    (JP) ................. 2013-228184

(51) Int. Cl.
*B21B 31/16*    (2006.01)
*B21B 37/58*    (2006.01)
(Continued)

(52) U.S. Cl.
CPC .............. *B21B 31/16* (2013.01); *B21B 37/58* (2013.01); *B21D 19/043* (2013.01);
(Continued)

(58) Field of Classification Search
CPC .......... B21D 5/16; B21D 19/02; B21D 19/04; B21D 19/043; B21D 19/06; B21D 19/12;
(Continued)

(56) References Cited

U.S. PATENT DOCUMENTS 5,228,190 A * 7/1993 Sawa ................... B21D 39/021
                                              29/243.57
6,442,451 B1 * 8/2002 Lapham ................. B25J 9/1656
                                              318/568.11
(Continued)

FOREIGN PATENT DOCUMENTS

EP    1389498    2/2004
FR    2895690    7/2007
(Continued)

OTHER PUBLICATIONS

Extended European Search Report for corresponding EP Application No. 14188736.4-1807, dated Apr. 7, 2015.
(Continued)

*Primary Examiner* — Peter DungBa Vo
*Assistant Examiner* — Joshua D Anderson
(74) *Attorney, Agent, or Firm* — Mori & Ward, LLP (57) ABSTRACT

A robot system includes an end effector, a robot arm, and a controller. The end effector includes a pressure roller and a linear motion mechanism. The linear motion mechanism is configured to move the pressure roller with respect to a pressed surface. The robot arm is configured to support the end effector. The controller is configured to control the linear motion mechanism to move the pressure roller to make a pressing force of the pressure roller against the pressed surface approximately uniform.

27 Claims, 9 Drawing Sheets

(51) Int. Cl.
   *B21D 39/02* (2006.01)
   *B21D 19/04* (2006.01)
   *B25J 9/16* (2006.01)
   *B21D 5/16* (2006.01)

(52) U.S. Cl.
   CPC ......... *B21D 39/021* (2013.01); *B21D 39/023* (2013.01); *B25J 9/1633* (2013.01); *B25J 9/1679* (2013.01); *B21D 5/16* (2013.01); *G05B 2219/39329* (2013.01); *G05B 2219/40052* (2013.01); *Y10S 901/02* (2013.01); *Y10S 901/15* (2013.01); *Y10S 901/41* (2013.01); *Y10T 29/49908* (2015.01)

(58) Field of Classification Search
   CPC ..... B21D 22/14–22/185; B21D 31/005; B21D 39/02; B21D 39/021; B21D 39/023; B21D 39/026; B21B 31/16; B21B 31/20; B21B 31/22; B21B 31/24; B21B 31/26; B21B 31/28; B21B 37/58; B21B 37/60; B25J 9/0045; B25J 9/0048; B25J 9/0096; B25J 9/106; B25J 9/12; B25J 9/123; B25J 9/1633; B25J 9/1679; G05B 2219/39001; G05B 2219/39018; G05B 2219/39329; Y10S 901/02; Y10S 901/09; Y10S 901/14; Y10S 901/15; Y10S 901/23; Y10S 901/41; Y10T 29/49908; Y10T 29/49915; Y10T 29/53387; Y10T 29/53422
   USPC .......................................... 72/210, 214, 220
   See application file for complete search history.

(56) References Cited

U.S. PATENT DOCUMENTS

| | | | |
|---|---|---|---|
| 7,152,447 B2* | 12/2006 | Toeniskoetter | B21D 39/021 29/243.58 |
| 2004/0035172 A1 | 2/2004 | Sawa | |
| 2005/0229666 A1 | 10/2005 | Toeniskoetter | |
| 2008/0000071 A1 | 1/2008 | Chen et al. | |
| 2008/0230588 A1 | 9/2008 | Hasegawa et al. | |
| 2010/0313621 A1* | 12/2010 | Kumagai | B21D 39/021 72/220 |
| 2011/0120978 A1 | 5/2011 | Takahashi et al. | |

FOREIGN PATENT DOCUMENTS

| | | |
|---|---|---|
| JP | 02-182328 | 7/1990 |
| JP | 2002-263756 | 9/2002 |
| JP | 2003-103325 | 4/2003 |
| JP | 2008-229697 | 10/2008 |
| JP | 2011-110578 | 6/2011 |

OTHER PUBLICATIONS

Japanese Office Action for corresponding JP Application No. 2013-228184, dated Sep. 1, 2015.
Chinese Office Action for corresponding CN Application No. 201410599393.2, dated Sep. 25, 2015.
Chinese Office Action for corresponding CN Application No. 201410599393.2, dated Jul. 26, 2016.
European Office Action for corresponding EP Application No. 14 188 736.4-1807, dated Jan. 5, 2017.

* cited by examiner

Comparative Example

| No. | Hemming command | Overview of function |
|---|---|---|
| 1 | HEM_ON | Start applying pressure |
| 2 | HEM_OFF | Stop applying pressure |
| 3 | HEM_CH | Change pressing force |
| 4 | HEM_PL | Switch to position control |
| 5 | HEM_KP | Maintain stroke position |
| ... | ... | ... |

ROBOT SYSTEM AND METHOD FOR PRODUCING TO-BE-PROCESSED MATERIAL

CROSS-REFERENCE TO RELATED APPLICATIONS

The present application claims priority under 35 U.S.C. § 119 to Japanese Patent Application No. 2013-228184, filed Nov. 1, 2013. The contents of this application are incorporated herein by reference in their entirety.

BACKGROUND

Field of the Invention

The present invention relates to a robot system and a method for producing a to-be-processed material.

Discussion of the Background

In recent years, various kinds of robot systems have been proposed to apply pressure on a to-be-processed material using a robot having a pressure roller on an end effector of the robot.

For example, Japanese Unexamined Patent Application Publication No. 2002-263756 discloses "roll hemming method". In the roll hemming method, a robot having an end effector with a pressure roller is used to perform hemming processing of bending a circumferential flange of an outer panel of a vehicle body into an approximately U shape.

The pressing force of the pressure roller is attributed to a linear motion mechanism disposed in the end effector or another element. The linear motion mechanism moves the pressure roller up and down with respect to a pressed surface. General linear motion mechanisms are made of components including a fluid cylinder, which utilizes fluid to implement hydraulic pressure or pneumatic pressure.

SUMMARY

According to one aspect of the present disclosure, a robot system includes an end effector, a robot arm, and a controller. The end effector includes a pressure roller and a linear motion mechanism. The linear motion mechanism is configured to move the pressure roller with respect to a pressed surface. The robot arm is configured to support the end effector. The controller is configured to control the linear motion mechanism to move the pressure roller to make a pressing force of the pressure roller against the pressed surface approximately uniform.

According to another aspect of the present disclosure, a method for producing a to-be-processed material includes operating a robot arm configured to support an end effector. The end effector includes a pressure roller and a linear motion mechanism. The linear motion mechanism is configured to move the pressure roller up and down with respect to a pressed surface. The linear motion mechanism is controlled to move the pressure roller up and down so as to make a pressing force of the pressure roller against the pressed surface approximately uniform.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

A robot system and a method for producing a to-be-processed material according to an embodiment will be described in detail by referring to the accompanying drawings. The following embodiment is provided for exemplary purposes only and is not intended to limit the present disclosure.

While the robot system is described as performing hemming processing, this should not be construed in a limiting sense. Other possible examples of the pressure processing other than the hemming processing include bending processing and metal-plate hammering processing.

The to-be-processed material, which is a target of the hemming processing, will be referred to as "workpiece".

Figure 1:
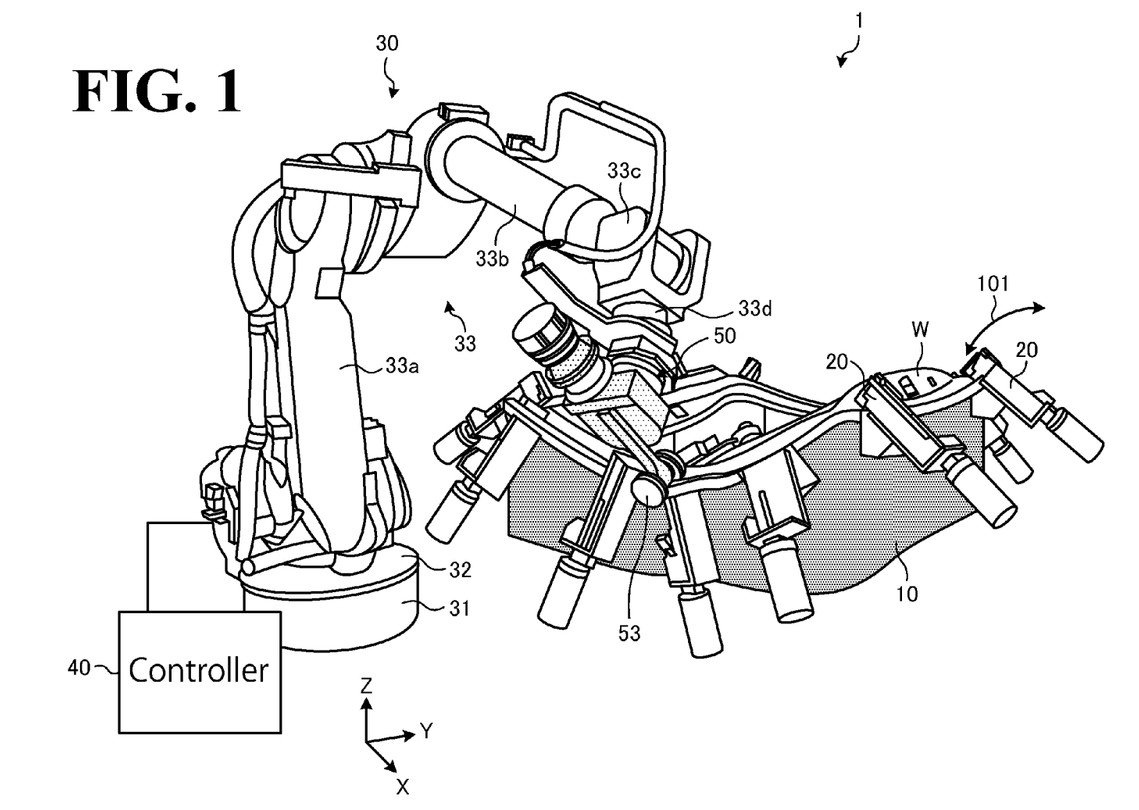
FIG. 1 is a diagram schematically illustrating a general arrangement of a robot system according to an embodiment.

FIG. 1 is a diagram schematically illustrating a general arrangement of a robot system 1 according to an embodiment. For ease of description, FIG. 1 shows a three-dimensional orthogonal coordinate system including a Z axis with its vertically upward direction being assumed the positive direction and the vertically downward direction being assumed the negative direction. This orthogonal coordinate system may also be illustrated in some other drawings referred to in the following description.

In the following description, a plurality of identical components may occasionally be described by providing a reference numeral to only some of the plurality of identical components, and providing no reference numeral to the rest of the plurality of identical components. In this case, the some of the plurality of identical components denoted with a reference numeral have the same configuration as the configuration of the rest of the plurality of identical components without a reference numeral.

As shown in FIG. 1, a robot system 1 includes a work table 10, a plurality of workpiece supports 20, a robot 30, and a controller 40.

A workpiece W is placed on the work table 10. The workpiece supports 20 are provided in plural to support the workpiece W at a plurality of points on an outer edge of the workpiece W, thereby securing the workpiece W on the work table 10. Each of the workpiece supports 20 is movable individually to make a withdrawal so as to avoid contact with a pressure roller 53, described later, while the pressure roller 53 is moving on a motion path along the outer edge of the workpiece W (see an arrow 101 shown in FIG. 1). This withdrawal operation is controlled by the controller 40, for example.

The robot 30 includes a base 31, a rotation base 32, and a robot arm 33. The robot arm 33 includes a lower arm 33a, an upper arm 33b, a wrist 33c, and a flange 33d.

The side of the surface on which the base 31 of the robot 30 is installed will be referred to as "base end side". A portion of each of the components around the base end side will be referred to as "base end portion". The flange 33d side of the robot 30 will be referred to as "distal end side". A portion of each of the components around the distal end side will be referred to as "distal end portion".

The base 31 is a supporting base secured on a floor or another surface. The rotation base 32 is rotatably disposed on the base 31. The lower arm 33a is rotatable relative to the rotation base 32.

The upper arm 33b is rotatable relative to the lower arm 33a. The wrist 33c disposed at the distal end portion of the upper arm 33b in a swingable manner. The flange 33d is rotatable relative to the wrist 33c.

To the flange 33d, an end effector 50 is mounted. The end effector 50 includes the pressure roller 53. Thus, the robot arm 33 supports the end effector 50.

Figure 2:
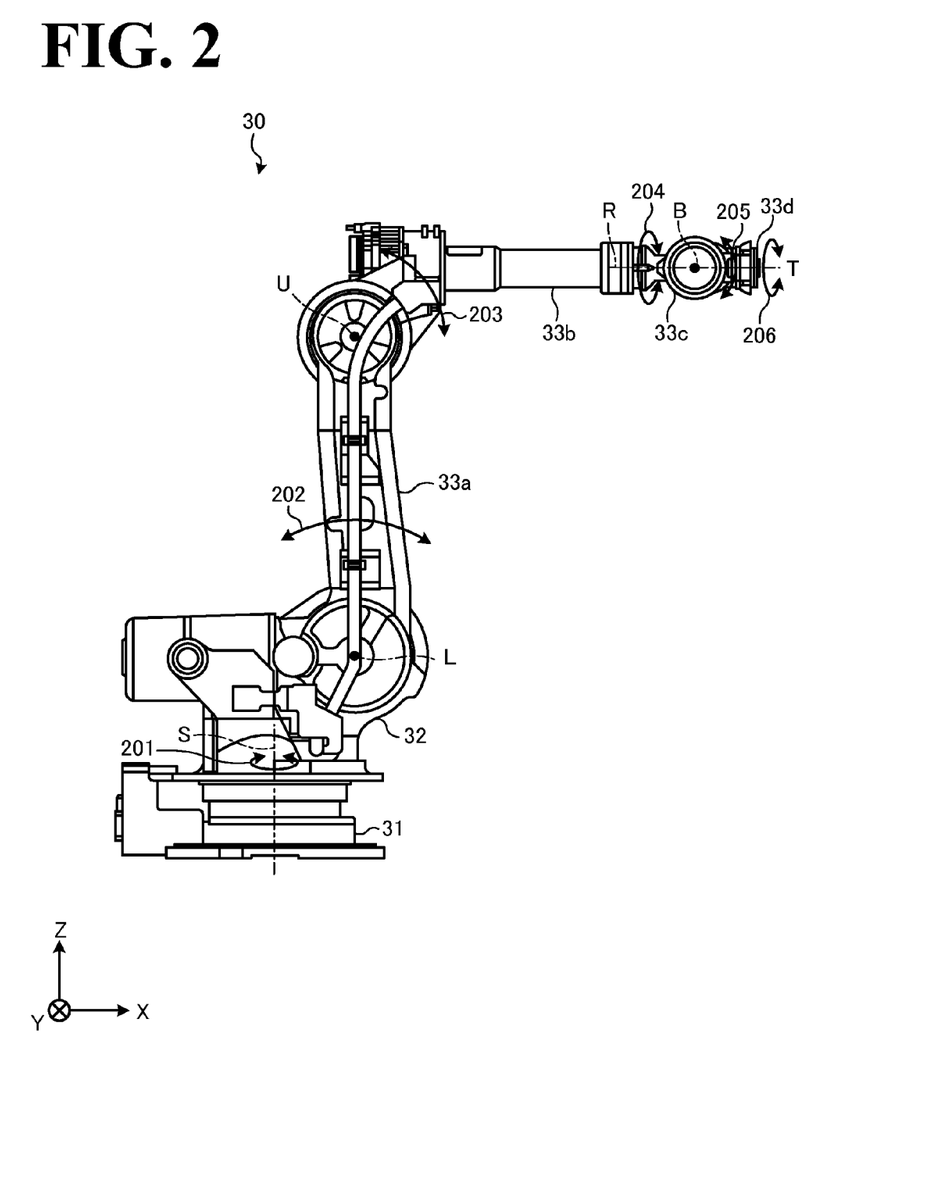
FIG. 2 is a schematic side view of a configuration of a robot.

A configuration of the robot 30 will be described in more detail by referring to FIG. 2. FIG. 2 is a schematic side view of a configuration of the robot 30.

As shown in FIG. 2, the robot 30 is what is called a vertical articulated robot. The rotation base 32 is coupled to the base 31 in a rotatable manner about a rotation axis S (see an arrow 201 shown in FIG. 2). The lower arm 33a has a base end portion coupled to the rotation base 32 in a rotatable manner about an axis L, which is approximately perpendicular to the rotation axis S (including a twisted position) (see an arrow 202 shown in FIG. 2).

The upper arm 33b has a base end portion coupled to the distal end portion of the lower arm 33a in a rotatable manner about an axis U, which is approximately parallel to the axis L (see an arrow 203 shown in FIG. 2). The wrist 33c has a base end portion coupled to the distal end portion of the upper arm 33b in a rotatable manner about an axis R, which is approximately perpendicular to the rotation axis U (including a twisted position) (see an arrow 204 shown in FIG. 2).

The wrist 33c is swingable about an axis B, which is approximately perpendicular to the axis R (see an arrow 205 shown in FIG. 2). The flange 33d is coupled to the wrist 33c in a rotatable manner about an axis T, which is approximately perpendicular to the axis B (see an arrow 206 shown in FIG. 2).

The robot arm 33 includes joints each having a built-in servomotor, not shown. The robot 30 is able to take various postures by controlling the rotation position of the servomotor of each joint.

As described above, the end effector 50 is mounted to the flange 33d. A configuration of the end effector 50 will be described in detail below.

Figure 3A:
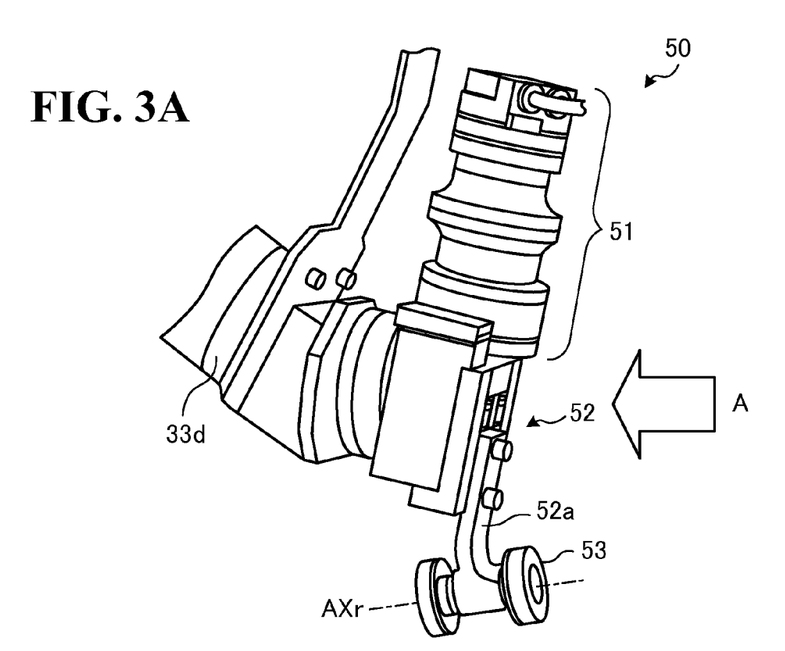
FIG. 3A is a perspective schematic view of a configuration of an end effector.
Figure 3B:
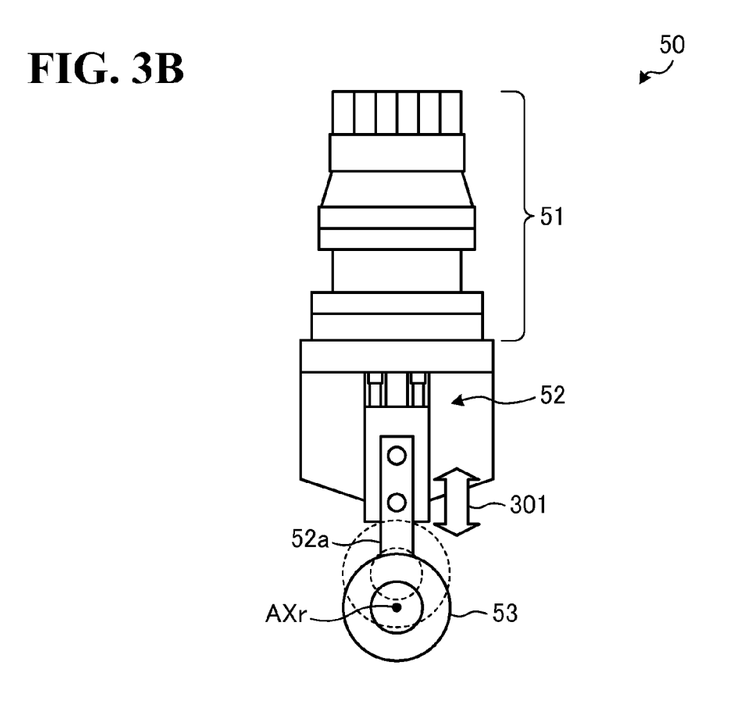
FIG. 3B is a schematic view from a direction of an arrow A shown in FIG. 3A.

FIG. 3A is a perspective schematic view of a configuration of the end effector 50. FIG. 3B is a schematic view from a direction of the arrow A shown in FIG. 3A. In FIG. 3B, the end effector 50 is shown more simply than in FIG. 3A.

As shown in FIGS. 3A and 3B, the end effector 50 includes a servomotor 51, a linear motion mechanism 52, and the pressure roller 53. The servomotor 51 is a driving source to drive the linear motion mechanism 52 into linear motion.

The linear motion mechanism 52 is driven by the servomotor 51 to move the pressure roller 53 up and down with respect to the pressed surface of the workpiece W (see an arrow 301 shown in FIG. 3B). The linear motion mechanism 52 preferably includes a ball screw or another element for such considerations as pressure responsiveness.

The pressure roller 53 is coupled to a linear motion shaft 52a, which is a movable part of the linear motion mechanism 52, in a rotatable manner about an axis AXr. The linear motion mechanism 52 brings the pressure roller 53 into contact with the pressed surface of the workpiece W. The pressure roller 53 makes rolling movement over the pressed surface while applying the pressing force from the servomotor 51 to the pressed surface. Thus, the pressed surface is subjected to the pressure processing.

Figure 3C:
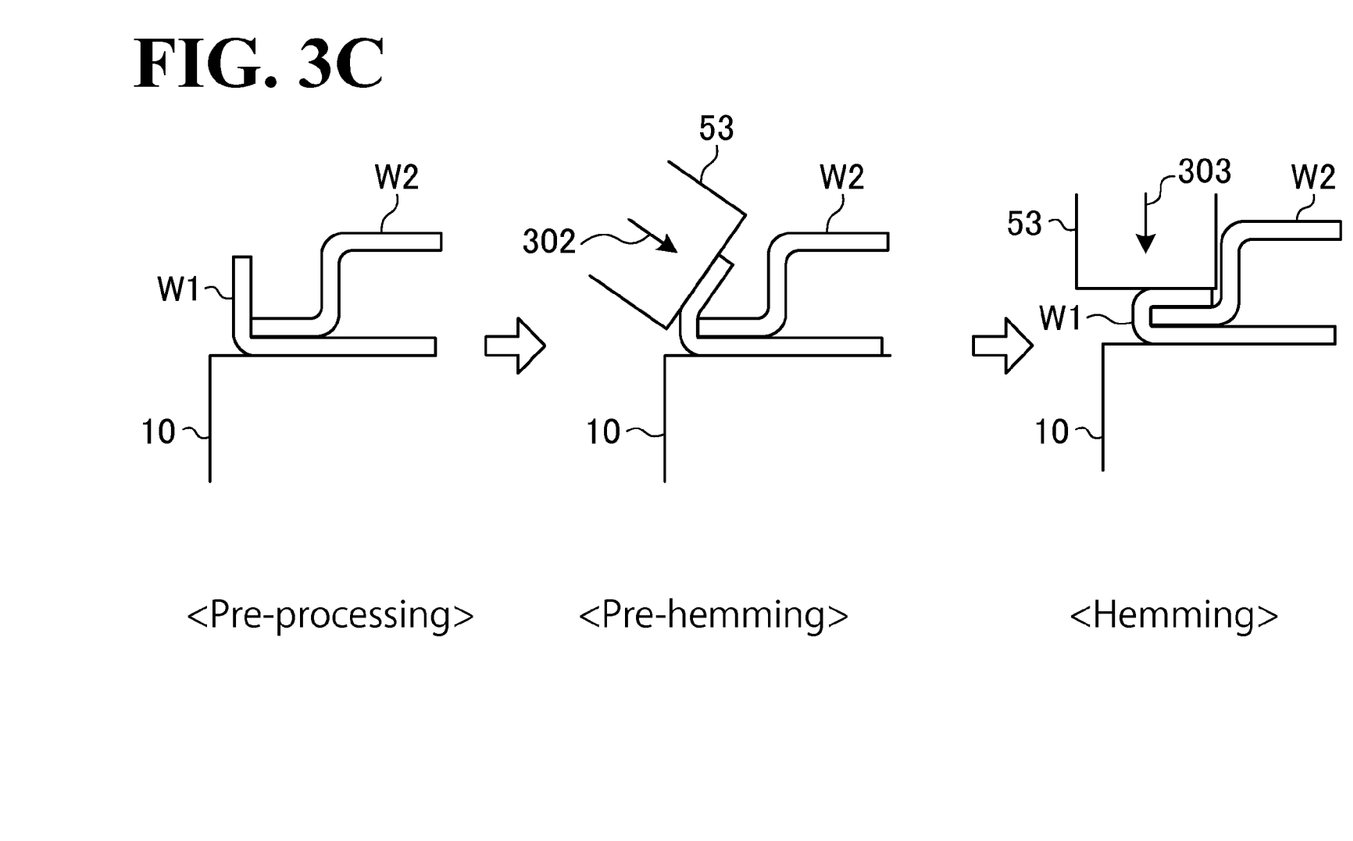
FIG. 3C is a schematic diagram illustrating an embodiment of hemming processing.

As an example of the pressure processing, an embodiment of hemming processing will be described. FIG. 3C is a schematic diagram illustrating an embodiment of the hemming processing. Reference numeral W1 shown in FIG. 3C denotes an outer edge portion of an outer panel of a vehicle body. Reference numeral W2 shown in FIG. 3C denotes an inner panel of the vehicle body. The to-be-processed material will not be limited to a vehicle body; other possible examples include a household appliance.

As shown in FIG. 3C, the hemming processing starts from "pre-processing" state, proceeds to preliminary bending processing referred to as "pre-hemming", and proceeds to main bending processing referred to as "hemming". Specifically, the outer edge portion W1 of the outer panel is bent by approximately 45° in the pre-hemming, and is bent into an approximately U shape in the hemming and thus joined with the inner panel W2.

Thus, as indicated by arrows 302 and 303 shown in FIG. 3C, the pressing direction of the pressure roller 53 differs between the "pre-hemming" and "hemming".

The pressing direction is determined by changing the posture of the robot 30. The posture of the robot 30 is changed by controlling the rotation position of each servomotor installed in the robot arm 33, as described above. The controller 40 (see FIG. 1) performs the operation control of changing the posture of the robot 30.

The controller 40 not only controls the pressing direction but also controls the pressing force against the pressed surface at the time of "pre-hemming" and "hemming". Specifically, the controller 40 controls the servomotor 51 to make the pressing force of the pressure roller 53 against the pressed surface suitable for the shape of the pressed surface, regardless of a change in shape of the workpiece W. Various kinds of control performed by the controller 40 will be described in detail later by referring to FIG. 5.

In this embodiment, the linear motion mechanism 52 is controlled through the servomotor 51, as described above. This ensures an elongated stroke length of the linear motion mechanism 52 as compared with the comparative practice to use a fluid cylinder or a similar device.

Figure 4A:
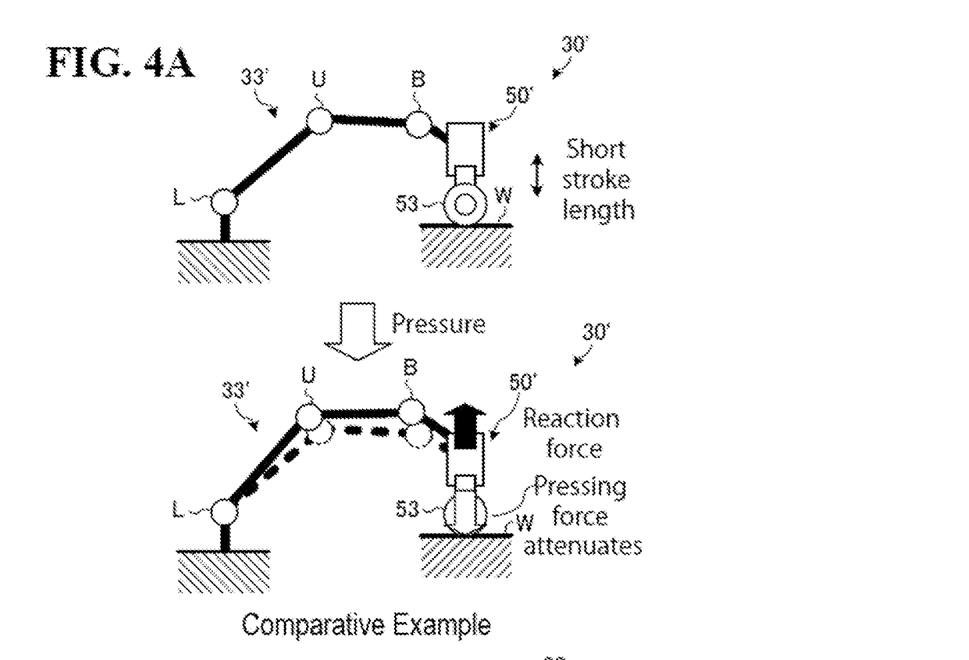
FIG. 4A schematically illustrates a disadvantage involved in pressure processing according to a comparative example.
Figure 4B:
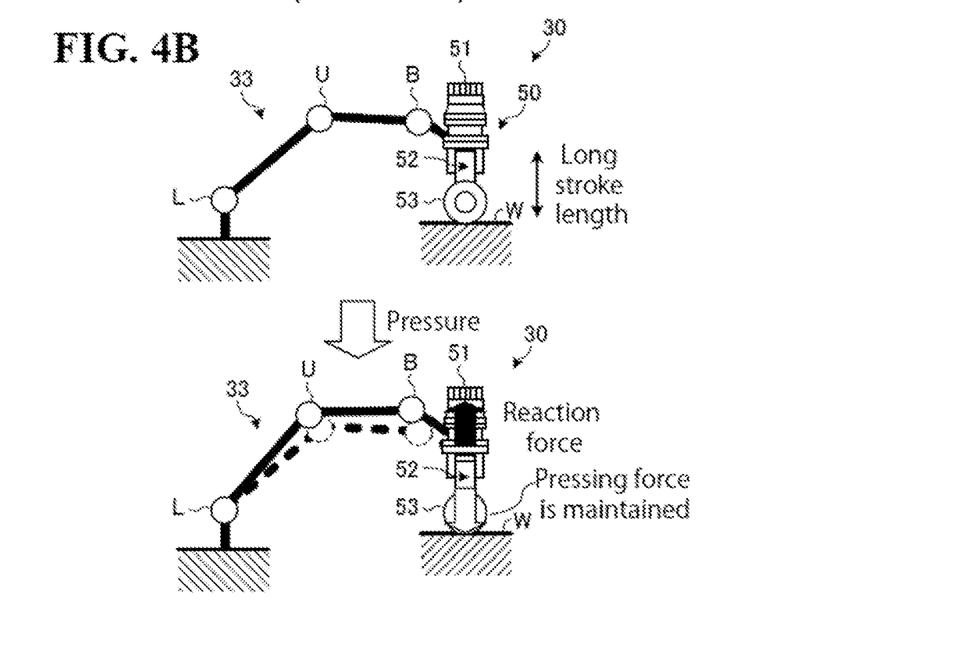
FIG. 4B schematically illustrates an advantage involved in pressure processing according to the embodiment.

This provides the following advantages. FIG. 4A schematically illustrates a disadvantage involved in comparative pressure processing. FIG. 4B schematically illustrates an advantage involved in the pressure processing according to this embodiment. For the sake of description, in FIGS. 4A and 4B, the robot 30 and a robot 30' and their respective components are shown simply using the axes L, U, and B.

As shown in FIG. 4A, which shows a comparative technique using an end effector 50' provided with a fluid cylinder or a similar device, the stroke length is short which can cause the pressure roller 53 to come off the pressed surface, attenuating the pressing force when the robot arm 33' is deflected by reaction force against the pressing force. Thus, there has been a disadvantage in that it is impossible or difficult to maintain the pressing force at a suitable level.

In contrast, in this embodiment, the servomotor 51 drive the linear motion mechanism 52, as shown in FIG. 4B. This ensures a longer stroke length, which prevents the pressure roller 53 from coming off the pressed surface even though the robot arm 33 is deflected by reaction force against the pressing force.

Additionally, even though the robot arm 33 is deflected, keeping the servomotor 51 driving ensures a balance between the pressing force and the reaction force. Thus, this embodiment provides an advantage in that the pressing force is maintained at a suitable level, contributing to improving the quality of the hemming processing.

The use of the servomotor 51 ensures monitoring of the stroke position based on a position detector such as an encoder. Thus, the servomotor 51 may be controlled to make the pressing force of the pressure roller 53 against the pressed surface of the workpiece W approximately uniform while monitoring the stroke position. This also improves the quality of the hemming processing.

Referring back to FIG. 1, the controller 40 will be described. The controller 40 is coupled in an information transmittable manner to various devices such as the workpiece support 20 and the robot 30. It is noted that any form of connection, wired or wireless, may be employed.

The controller 40 is a controller to control various operations of the various devices coupled to the controller 40, and includes various control-related devices, a processing unit, and a storage device.

For example, the controller 40 performs the operation control of changing the posture of the robot 30 based on a "job", which is a predetermined program to bring the robot 30 into operation. The job is registered in the storage device or a similar device of the controller 40 through an input device (such as a programming pendant), not shown.

Based on the "job", the controller 40 generates an operation signal to bring the robot 30 into operation, and outputs the signal to the robot 30. The operation signal is generated in the form of a pulse signal to the servomotor installed in each joint.

Figure 5:
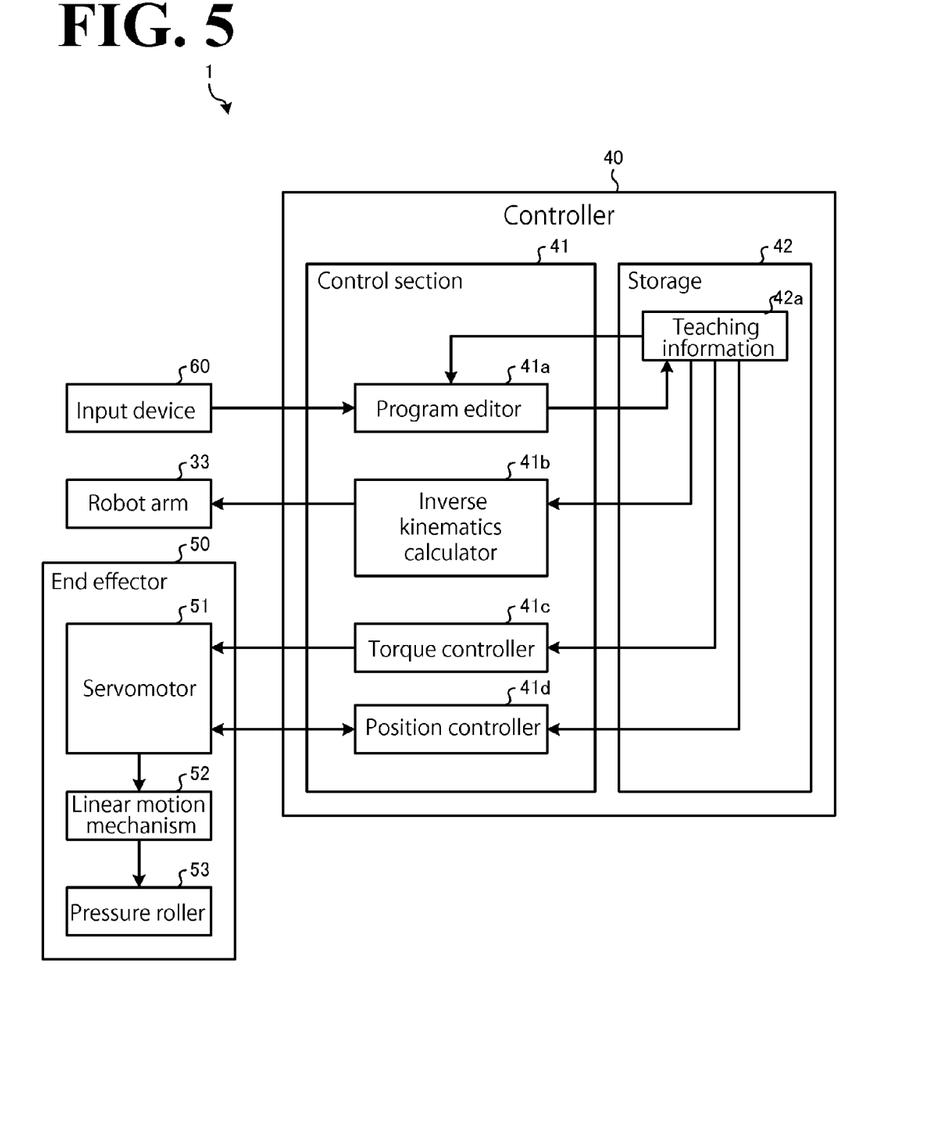
FIG. 5 is a block diagram illustrating a configuration of the robot system according to the embodiment.

Next, a block configuration of the robot system 1 according to this embodiment will be described by referring to FIG. 5, focusing mainly on an inner configuration of the controller 40. FIG. 5 is a block diagram illustrating a configuration of the robot system 1 according to this embodiment. It is noted that FIG. 5 only shows those components necessary for description of the robot system 1, omitting those components of general nature.

The description by referring to FIG. 5 may occasionally simplify or omit those components already described by referring to FIGS. 1 to 4B.

As shown in FIG. 5, the controller 40 includes a control section 41 and a storage 42. The control section 41 includes a program editor 41a, an inverse kinematics calculator 41b, a torque control section 41c, and a position control section 41d.

The storage 42 is a storage device such as a hard disk drive and a nonvolatile memory, and stores teaching information 42a. The teaching information 42a defines the motion path of the robot arm 33, and is an example of the program storage.

The controller 40 shown in FIG. 5 may not necessarily have all its components arranged within the controller 40. For example, while the teaching information 42a is stored in the storage 42, the teaching information 42a may be stored in an internal memory of the robot 30. Alternatively, the teaching information 42a may be stored in an upper level device of the controller 40, and may be acquired by the controller 40 from the upper level device as necessary.

The control section 41 is in charge of overall control of the controller 40. Specifically, the control section 41 controls the linear motion mechanism 52 to move the pressure roller 53 up and down with respect to the pressed surface of the workpiece W so as to make the pressing force of the pressure roller 53 against the pressed surface approximately uniform.

The program editor 41a receives settings related to the hemming processing through an input device 60 such as a personal computer (PC) and a programming pendant. The settings related to the hemming processing include a setting of starting the operation control of the linear motion mechanism 52 of the end effector 50, and a setting of ending the operation control of the linear motion mechanism 52 of the end effector 50. The program editor 41a reflects the content of the received setting in the program included in the teaching information 42a.

Through the program editor 41a, an operator of the input device 60 may use a macro command to define the setting related to the hemming processing at any timing (step position) on the program. That is, the program editor 41a includes a preprocessor function that converts the macro command into a program. The macro command related to the hemming processing will be hereinafter referred to as "hemming command"

Figure 6:
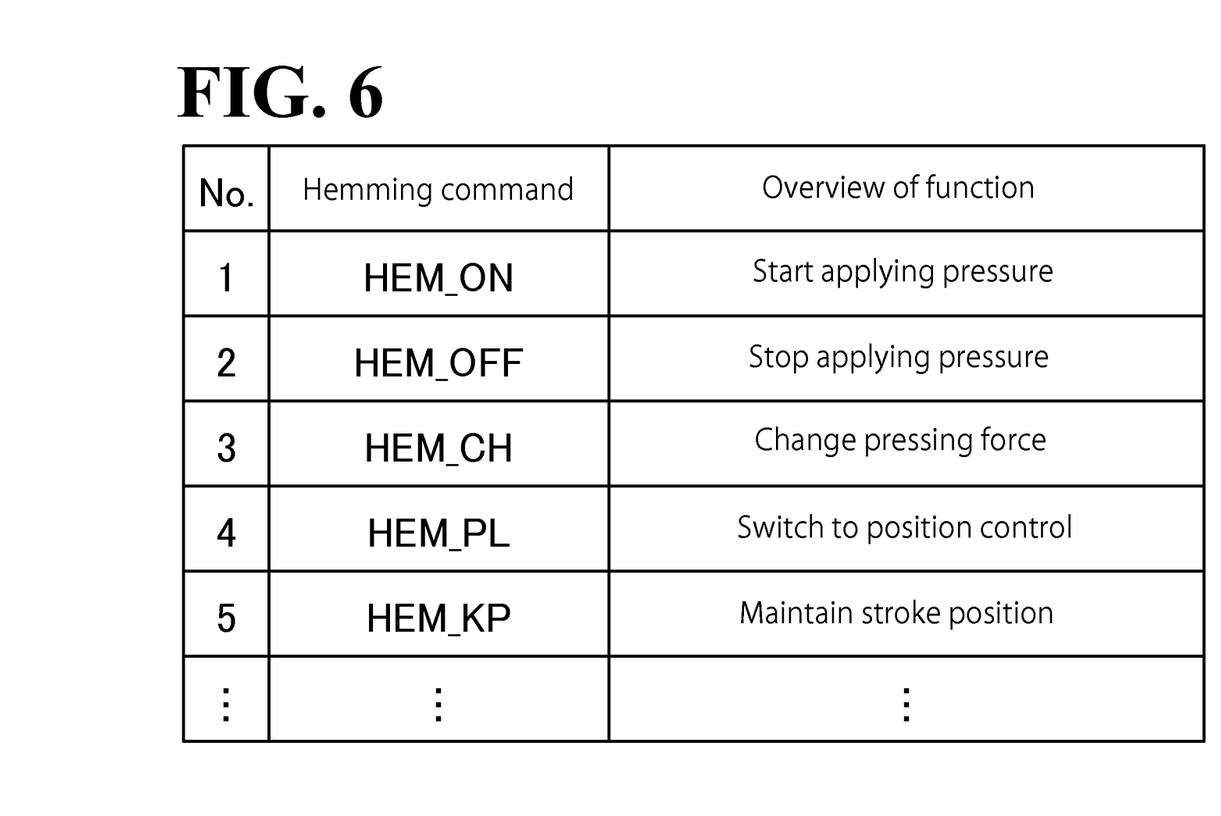
FIG. 6 is a diagram illustrating exemplary hemming commands.

Exemplary hemming commands will be described by referring to FIG. 6. FIG. 6 is a diagram illustrating exemplary hemming commands.

As shown in FIG. 6, the hemming commands are defined in advance as macro commands related to the torque control and the position control of the servomotor 51.

For example, No. 1 to No. 3 in FIG. 6 indicate hemming commands related to the torque control for the servomotor 51. The command "HEM_ON" at No. 1 is a command for an instruction to start applying pressure at a predetermined torque. The command "HEM_OFF" at No. 2 is a command for an instruction to stop applying pressure.

Figure 7A:
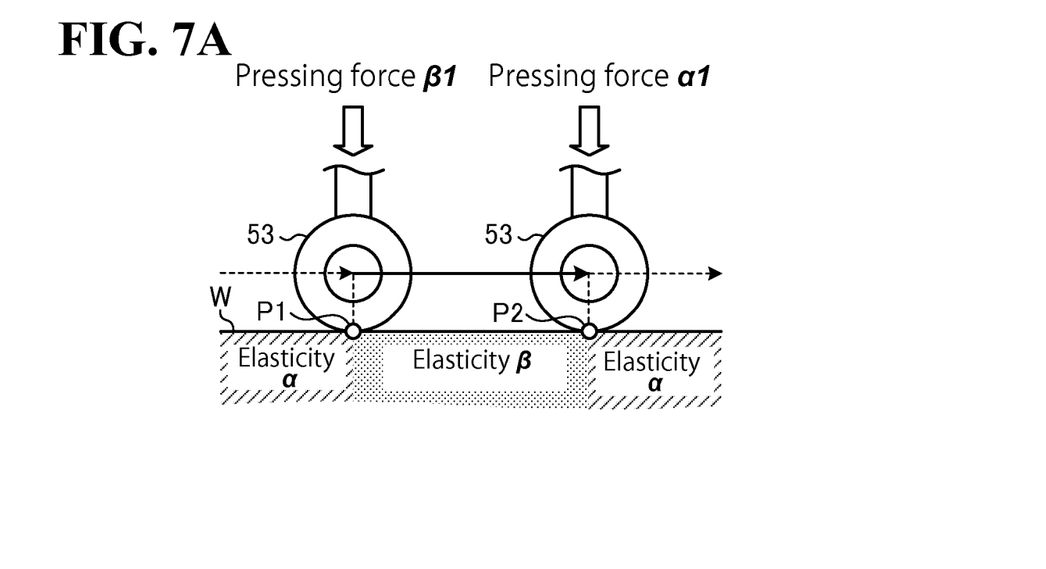
FIG. 7A is a diagram illustrating a hemming command to change pressing force.

The command "HEM_CH" at No. 3 is a command to change the pressing force along the motion path. The hemming command to change the pressing force may be used in the following exemplary case. FIG. 7A is a diagram illustrating the hemming command to change the pressing force.

First, the workpiece W may not be uniform throughout the pressed surface in terms of shape, property, or other respects. Assume the example shown in FIG. 7A, where portions of different elasticities exist along the motion path of the pressure roller 53 (see "elasticity α" and "elasticity β" shown in FIG. 7A). Points P1 and P2 shown in FIG. 7A indicate target points on the motion path.

In this case, pressing the portion of "elasticity α" and the portion of "elasticity β" at the same torque may not result in an approximately uniform pressing force from the pressure roller 53 against the pressed surface 53. In view of this, the command "HEM_CH" may be used to define the program to, for example, make the pressing force suitable for the elasticity of interest. This makes the pressing force applied to the pressed surface approximately uniform.

In the example shown in FIG. 7A, the operator uses the command "HEM_CH" to define the program in such a manner that at the timing when the pressure roller 53 is at target point P1, the servomotor 51 effects pressing force β1, which is suitable for elasticity β.

At the timing when the pressure roller 53 is at target point P2, the operator uses the command "HEM_CH" to define the program in such a manner that the servomotor 51 effects pressing force α1, which is suitable for elasticity α.

While this example is concerning a difference in "elasticity", it is also possible to use the command "HEM_CH" in a difference in any other property. It will be readily appreciated that the command "HEM_CH" may be used in accordance with the shape of the workpiece W.

Referring back to FIG. 6, the hemming commands related to the position control will be described. As shown in FIG. 6, No. 4 and No. 5 indicate hemming commands related to the position control of the servomotor 51. The command "HEM_PL" at No. 4 is a command for an instruction to switch the torque control to the position control. The command "HEM_KP" at No. 5 is a command for maintaining the stroke position of the linear motion mechanism 52.

Figure 7B:
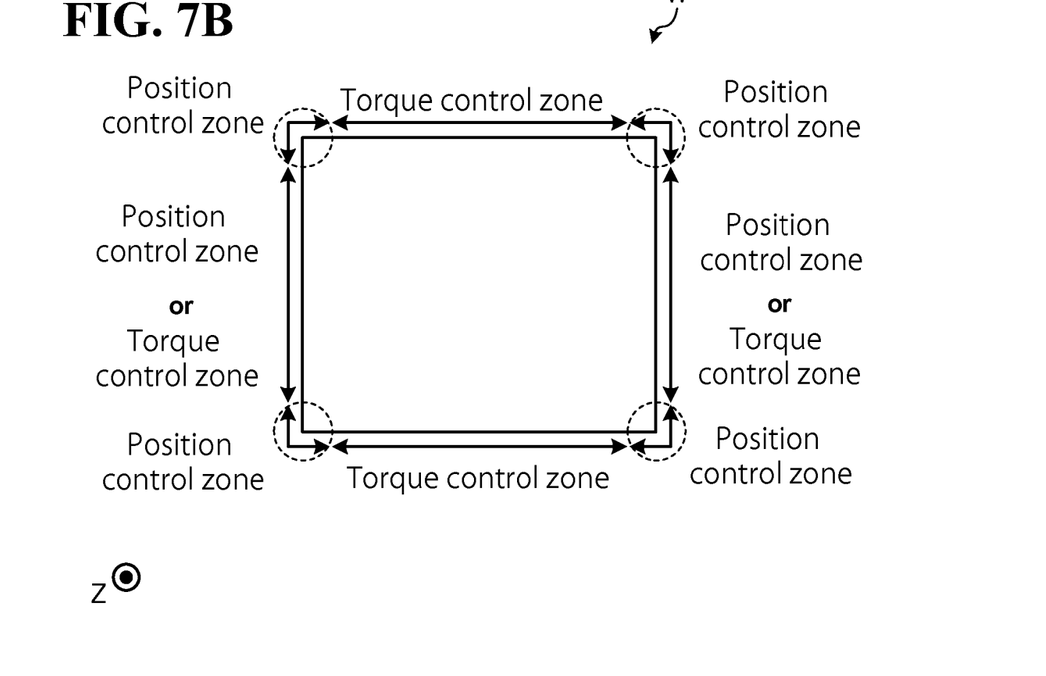
FIG. 7B is a diagram illustrating a hemming command related to position control.

The hemming commands related to the position control may be used in the following exemplary case. FIG. 7B is a diagram illustrating a hemming command related to the position control.

As shown in FIG. 7B, there is a workpiece W having a rectangular shape in plan view. The workpiece W undergoes the hemming processing on the outer edge of the workpiece W.

The corners and adjacent portions of the workpiece W, which are circled by broken lines in FIG. 7B, are soft and susceptible to elastic deformation. In this case, it is more preferable in terms of processing quality to use the position control than the torque control in that under the position control, pressure is applied on the corners and adjacent portions while the stroke position is being adjusted.

Thus, for the corners and adjacent portions of the workpiece W, the program is preferably defined to perform the position control using the command "HEM_PL". This improves the quality of the hemming processing.

For the sides of the rectangular workpiece W, excluding the corners, it is preferable in terms of processing quality to maintain the stroke position during pressure application in, for example, "pre-hemming" (see FIG. 3C).

Thus, in "pre-hemming", the program is preferably defined to maintain the stroke position using the command "HEM_KP". In "hemming", which is the main bending, it is possible to perform the torque control for the sides of the rectangular workpiece W. Thus, the torque control and the position control are defined at step positions of the program suitable for the shape and property of a portion of the workpiece W or the type of the processing. This improves the quality of the hemming processing.

The operator is able to recognize the content of the setting related to the hemming processing simply in the form of macro commands, and readily define the hemming commands at any step positions of the program through the input device 60. Thus, the hemming processing is facilitated.

Referring back to FIG. 5, the inverse kinematics calculator 41b will be described. The inverse kinematics calculator 41b controls the rotation position of each joint of the robot arm 33 based on the motion path of the robot arm 33, which is taught in advance as the teaching information 42a. Thus, the inverse kinematics calculator 41b is in charge of the step of bringing the robot arm 33 into operation.

Specifically, for example, the inverse kinematics calculator 41b regards a coordinate value of a target point on the motion path as the position of a representative point of the end effector 50, and regards the pressing direction at this position as the posture of the end effector 50. Then, the inverse kinematics calculator 41b generates an operation signal to bring the robot 30 into operation. The operation signal is generated as, for example, a pulse signal to the servomotor installed in each joint of the robot arm 33.

The torque control section 41c controls the torque of the servomotor 51 of the end effector 50 so as to perform the control of making the pressing force of the pressure roller 53 against the pressed surface of the workpiece W approximately uniform. Specifically, the torque control section 41c performs the torque control of the servomotor 51 based on the hemming commands reflected in the teaching information 42a by the program editor 41a.

The position control section 41 controls the amount by which the pressure roller 53 protrudes, that is, controls the stroke position of the linear motion mechanism 52. Specifically, the position control section 41d controls the stroke position of the linear motion mechanism 52 by performing the position control of the servomotor 51 based on the hemming commands reflected in the teaching information 42a by the program editor 41a.

The position control section 41d monitors the stroke position of the linear motion mechanism 52 based on a detection result obtained by the encoder of the servomotor 51. When the position control section 41d detects an abnormality through the monitoring, the position control section 41d performs predetermined error processing. Thus, the torque control section 41c and the position control section 41d are in charge of the step of the pressure roller 53's control to make the linear motion mechanism 52 move up and down.

Figure 8:
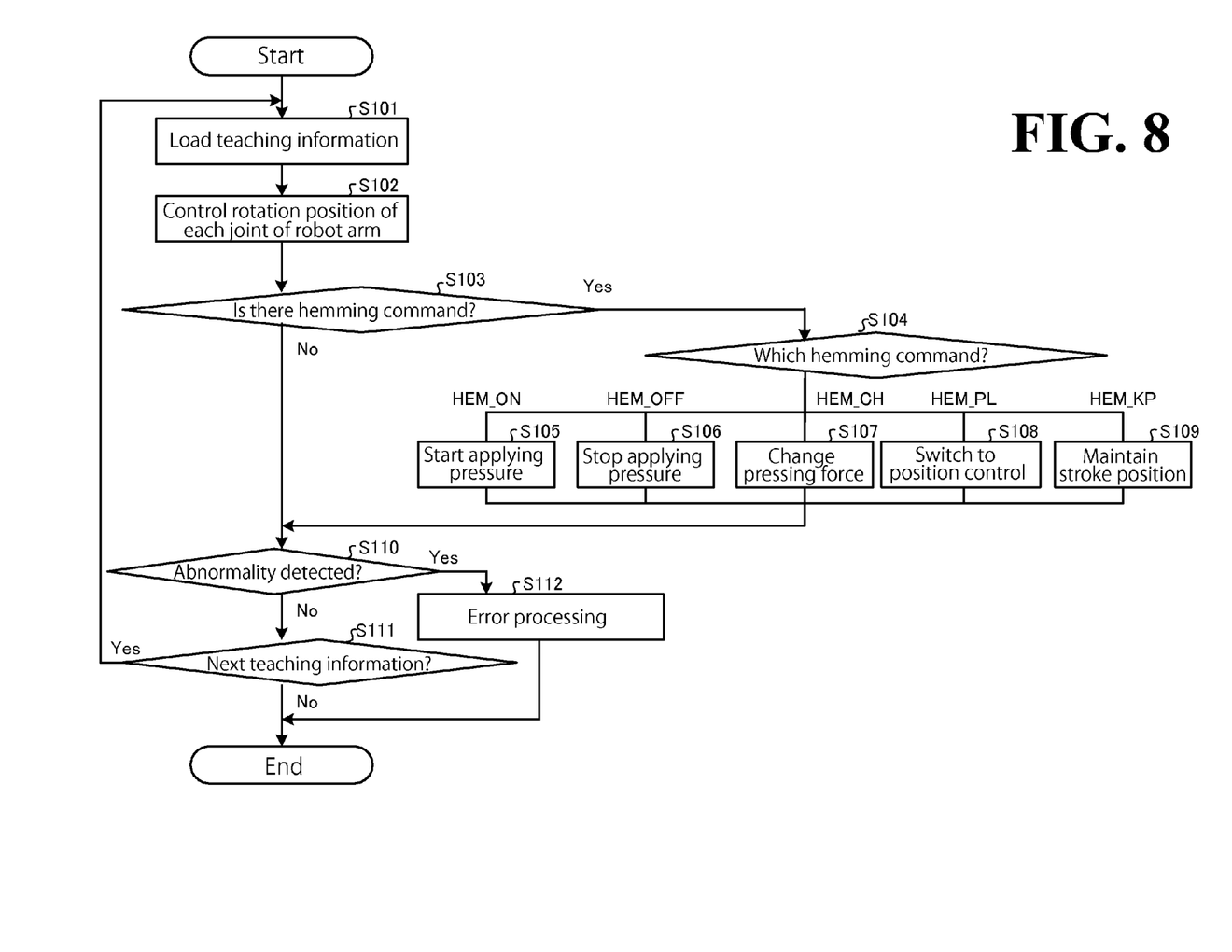
FIG. 8 is a flowchart of a procedure for processing executed by the robot system according to the embodiment.

Next, a procedure for the processing executed by the robot system 1 according to this embodiment will be described by referring to FIG. 8. FIG. 8 is a flowchart of a procedure for the processing executed by the robot system 1 according to this embodiment. FIG. 8 shows a state in which the program editor 41a has already reflected in the teaching information 42a the program in which the hemming commands are defined.

As shown in FIG. 8, first, the teaching information 42a is loaded (step S101). Here, the program contained in the teaching information 42a is loaded on a one-step basis.

Then, the inverse kinematics calculator 41b controls the rotation position of each joint of the robot arm 33 based on the teaching information 42a (step S102).

When the posture of the robot arm 33 changes, a determination is made as to whether a hemming command has been issued (step S103). When a determination is made to the effect that a hemming command has been issued (Yes in step S103), the type of the hemming command is determined (step S104).

When the hemming command is "HEM_ON", the torque control section 41c controls the servomotor 51 to start applying pressure (step S105). When the hemming command is "HEM_OFF", the torque control section 41c controls the servomotor 51 to stop applying pressure (step S106).

When the hemming command is "HEM_CH", the torque control section 41c controls the servomotor 51 to change the pressing force (step S107).

When the hemming command is "HEM_PL", the position control section 41d switches the torque control to the position control (step S108). When the hemming command is "HEM_KP", the position control section 41d maintains the stroke position of the linear motion mechanism 52 (step S109).

When the determination condition at step S103 is not satisfied (No at step S103), the control proceeds to step S110.

At step S110, a determination is made as to whether the position control section 41d has detected an abnormality through monitoring of the stroke position (step S110). When no abnormality is detected in the monitoring (No at step S110), a determination is made as to whether the teaching information 42a contains a next program step (step S111).

When the teaching information 42a contains the next program step (Yes at step S111), the processing from step S101 on is repeated. When the teaching information 42a does not contain the next program step (No at step S111), the processing ends.

When at step S110 an abnormality is detected in the monitoring (Yes at step S110), predetermined error processing is performed (step S112), and then the processing ends.

As has been described hereinbefore, the robot system according to this embodiment includes the end effector, the robot arm, and the controller. The end effector includes the pressure roller and the linear motion mechanism. The linear motion mechanism moves the pressure roller up and down with respect to a pressed surface.

The robot arm supports the end effector. The controller controls the linear motion mechanism to move the pressure roller up and down so as to make the pressing force of the pressure roller against the pressed surface approximately uniform.

Thus, the robot system according to this embodiment ensures readiness and higher quality in the pressure processing.

In this embodiment, the linear motion mechanism is driven by a servomotor. This facilitates the wiring work in that thinner outfitting cables and other cables may be used as compared with the comparative practice to use a fluid cylinder or a similar cylinder. This, in turn, improves maintenance efficiency and provides no or minimal restriction on the operation of the robot, resulting in improved mobility of the robot.

In this embodiment, the workpiece supports support the workpiece at a plurality of points on the outer edge of workpiece, thereby securing the workpiece on the work table. This, however, should not be construed as limiting the method of securing the workpiece. Another possible example is to provide the work table with a suction device, which is capable of vacuum suction, to secure the workpiece on the work table using the suction device.

In this embodiment, the robot has a single arm with six axes. This, however, should not be construed as limiting the number of axes and the number of arms. Other possible examples include, but are not limited to, a seven-axis robot and a two-arm robot.

Obviously, numerous modifications and variations of the present disclosure are possible in light of the above teachings It is therefore to be understood that within the scope of the appended claims, the present disclosure may be practiced otherwise than as specifically described herein.

What is claimed as new and desired to be secured by letters patent of the United States is:

1. A robot system comprising:
   an end effector comprising:
      a pressure roller that forms a distal end of the end effector; and
      a linear motion mechanism configured to move the pressure roller with respect to a pressed surface and change a stroke position of the pressure roller as an amount by which the pressure roller protrudes from a central portion of the end effector;
   a robot arm configured to support the end effector; and
   a controller configured to control the linear motion mechanism to move the pressure roller to make a pressing force of the pressure roller against the pressed surface approximately uniform during a torque control during which the controller is configured to set a torque of a motor configured to drive the linear motion mechanism into linear motion at a predetermined torque, configured to switch from the torque control to a position control during which the controller is configured to control the stroke position of the pressure roller, and configured to drive the linear motion mechanism when the robot arm is deflected by a reaction force that opposes the pressing force.

2. The robot system according to claim 1, wherein the linear motion mechanism is configured to move the pressure roller up and down with respect to the pressed surface.

3. The robot system according to claim 2, wherein the controller is configured to change the pressing force in accordance with at least one of a shape and a property of the pressed surface.

4. The robot system according to claim 2, wherein the pressed surface comprises a hemming surface subjected to bending processing by the pressure roller.

5. The robot system according to claim 1, wherein the motor comprises a servomotor.

6. The robot system according to claim 5, wherein the controller is configured to change the pressing force in accordance with at least one of a shape and a property of the pressed surface.

7. The robot system according to claim 5, further comprising a program storage configured to store a program defining a motion path of the robot arm,
   wherein the controller comprises a program editor configured to receive in the program a setting of starting operation control of the linear motion mechanism of the end effector, and configured to receive in the program a setting of ending the operation control of the linear motion mechanism of the end effector.

8. The robot system according to claim 7, wherein the program editor is configured to, at a desired timing in the program, define a command to control the torque of the servomotor during the torque control and a command to control the stroke position of the linear motion mechanism during the position control.

9. The robot system according to claim 5, wherein the controller is configured to hold the distance constant during the position control.

10. The robot system according to claim 1, wherein the controller is configured to maintain the stroke position at a predetermined position during the position control.

11. The robot system according to claim 10, wherein the controller is configured to change the pressing force in accordance with at least one of a shape and a property of the pressed surface.

12. The robot system according to claim 1, wherein the pressed surface comprises a hemming surface subjected to bending processing by the pressure roller.

13. The robot system according to claim 12, wherein the controller is configured to change the pressing force in accordance with at least one of a shape and a property of the pressed surface.

14. The robot system according to claim 1,
   wherein the robot arm comprises a plurality of joints, and wherein the controller comprises an inverse kinematics calculator configured to control rotation positions of the plurality of joints based on a motion path of the robot arm taught in advance.

15. The robot system according to claim 14, wherein the controller is configured to change the pressing force in accordance with at least one of a shape and a property of the pressed surface.

16. The robot system according to claim 1, wherein the controller is configured to change the pressing force in accordance with at least one of a shape and a property of the pressed surface.

17. The robot system according to claim 1, wherein the pressure roller rotates about an axis, the axis being spaced away from the central portion of the end effector, a distance by which the axis is spaced away from the central portion of the end effector being changeable by the linear motion mechanism.

18. The robot system according to claim 1, further comprising a linear motion shaft which is directly coupled to the pressure roller, the position of the linear motion shaft being movable with the pressure roller to change a distance between the linear motion shaft and the central portion of the end effector.

19. The robot system according to claim 1,
wherein the robot arm comprises a flange to which the end effector is mounted, and
wherein the linear motion mechanism is configured to change a position of the distal end of the end effector relative to the flange.

20. The robot system according to claim 1, further comprising: the motor comprises a servomotor configured to drive the linear motion mechanism into linear motion, the servomotor including a position detector, and
wherein the controller is configured to monitor the stroke position based on the position detector.

21. The robot system according to claim 1, wherein the controller is configured to switch to the position control in a case where the pressed surface is susceptible to elastic deformation.

22. The method according to claim 1, wherein the controller is configured to switch from the torque control to the position control at a predetermined position relative to the pressed surface.

23. A method for producing a to-be-processed material, the method comprising:
operating a robot arm configured to support an end effector, the end effector comprising a pressure roller that forms a distal end of the end effector and a linear motion mechanism, the linear motion mechanism being configured to move the pressure roller up and down with respect to a pressed surface and change a stroke position of the pressure roller as an amount by which the pressure roller protrudes from a central portion of the end effector;
controlling the linear motion mechanism to move the pressure roller up and down so as to make a pressing force of the pressure roller against the pressed surface approximately uniform during a torque control during which a torque of a motor configured to drive the linear motion mechanism into linear motion is set at a predetermined torque;
driving the linear motion mechanism when the robot arm is deflected by a reaction force that opposes the pressing force; and
switching from the torque control to a position control during which the stroke position of the pressure roller is controlled.

24. The method according to claim 23, further comprising switching to the position control in a case where the pressed surface is susceptible to elastic deformation.

25. The method according to claim 23, further comprising holding the stroke position constant during the position control.

26. The method according to claim 23, wherein the switching from the torque control to the position control is performed at a predetermined position relative to the pressed surface.

27. A robot system comprising:
an end effector comprising:
a pressure roller that forms a distal end of the end effector; and
a linear motion mechanism configured to move the pressure roller with respect to a pressed surface and change a stroke position of the pressure roller as an amount by which the pressure roller protrudes from a central portion of the end effector;
a robot arm configured to support the end effector; and
a controller configured to control the linear motion mechanism to move the pressure roller to make a pressing force of the pressure roller against the pressed surface approximately uniform during a torque control during which the controller is configured to set a torque of a motor configured to drive the linear motion mechanism into linear motion at a predetermined torque,
wherein the pressed surface includes a corner portion and a side portion spaced from the corner portion, and
wherein the controller is configured to switch from the torque control to a position control and adjust the stroke position at the corner portion during the position control and maintain the stroke position at a predetermined position at the side portion during the position control.

* * * * *